United States Patent

[11] 3,594,579

| [72] | Inventors | Roger E. Garrett;<br>Wilson K. Talley, both of Davis, Calif. |
|---|---|---|
| [21] | Appl. No. | 735,083 |
| [22] | Filed | June 6, 1968 |
| [45] | Patented | July 20, 1971 |
| [73] | Assignee | The Regents of the University of California<br>Berkeley, Calif. |

[54] DEVICE AND METHOD USING GAMMA RAYS FOR SIZE AND DENSITY PRODUCE SELECTION
1 Claim, 8 Drawing Figs.

[52] U.S. Cl........................................................ 250/83.3,
209/111.5, 250/71.5
[51] Int. Cl........................................................ G01t 1/202,
G01n 9/24, G01n 23/06
[50] Field of Search........................................... 250/83.30,
43.5 FL, 43.5 D:; 209/111.5

[56] References Cited
UNITED STATES PATENTS
3,368,593  2/1968  Mamas.......................... 250/43.5 FL

*Primary Examiner*—William E. Lindquist
*Assistant Examiner*—Morton J. Frome
*Attorney*—Lothrop & West

ABSTRACT: A produce selector for harvesting produce moves a radiation source (viz. gamma rays) relative to the produce with a collimated pencil of radiation travelling through the produce to a receiver on the other side of the produce. The response of the receiver is a direct signal. This may be integrated to provide an indirect signal. These signals are used individually or together to afford a final response. A response exceeding a threshold value can be used to actuate a harvester. The method of selecting produce involves sending a signal through the produce, the signal being attenuated in accordance with the density and size (viz. thickness), and determining the value of the attenuated signal.

INVENTORS
ROGER E. GARRETT
BY WILSON K. TALLEY

Lothrop & West

PATENTED JUL20 1971 3,594,579

INVENTORS
ROGER E. GARRETT
BY WILSON K. TALLEY
Lothrop & West

INVENTORS
ROGER E. GARRETT
WILSON K. TALLEY
BY
Lothrop & West

DEVICE AND METHOD USING GAMMA RAYS FOR SIZE AND DENSITY PRODUCE SELECTION

Considerable work has been done in connection with certain field-grown crops, head lettuce as an example, in order to determine the fitness of the individual plants for picking or harvesting. Lettuce heads, particularly, mature at different times and have an optimum picking condition which ranges over only a relatively few days. Thus, it is customary to pick the same lettuce field repeatedly during a season in order each time to garner as many marketable heads of lettuce as possible. This presently requires judgment, hand selection and harvesting by whatever random or experienced crew that can be kept available over an extended harvesting period. The selection is performed largely by the individual members of the field crew, who scan the rows of growing lettuce heads for appearance as to size and general configuration. Often each lettuce head is felt or depressed in order to estimate in an empirical fashion the firmness of the head. Those heads which are relatively infirm are probably too small or not sufficiently developed for picking, although some heads with a large number of wrapper leaves are not easily sensed accurately in this way. The pressure testing may cause mechanical damage. The standards or specifications for head lettuce appropriate for harvesting are rather loosely drawn. There is still a problem of selecting lettuce heads precisely. However, there are experienced, individual lettuce graders who have generally been able to maintain fairly close standards and to achieve reasonably good agreement among themselves as to the character of each head in a lot of lettuce heads to be graded. Some mechanisms have been developed to perform mechanically a separating or indicating function to determine which lettuce heads in a row should be harvested at a particular time. Those devices generally depend upon depressing the crown of the head of larger lettuce and selecting only those heads which respond in a measured, small way to the depressing force. While this technique is an improvement over hand selection in many regards, there is still room for a more advantageous approach to the problem.

Head lettuce is referred to herein because most of the background work has been done with that product, but other produce, such as cabbage and cauliflower, can be similarly treated.

It is therefore a general object of the invention to provide a produce selector for harvesting produce having heads, such as lettuce, and to provide a reliable means of selecting appropriate heads for harvest.

Another object of the invention is in general to provide a means and method for appropriately selecting lettuce heads in reliance upon factors that are reasonably consistent and fairly acceptable by experienced graders.

Another object of the invention is to provide a produce selector and method which will adhere closely to arbitrary standards for harvest.

A further object of the invention is to provide, with less labor, a produce selector and method which will provide results in practice at least as good as and preferably considerably better than the results afforded by the best trained and most closely controlled present harvesting devices and methods.

Another object of the invention is to provide a selector and method which will afford picking criteria for head produce without physical contact therewith or handling damage thereto.

Another object of the invention is to provide an economical and effective produce selector and method for selecting produce.

Another object of the invention is to provide a measure of the density of the object examined without necessarily determining previously the location along the row and exact geometry of the body.

Other objects of the invention together with the foregoing are attained in the embodiments of the invention described in the accompanying description and illustrated in the accompanying drawings, in which.

Figure 1:
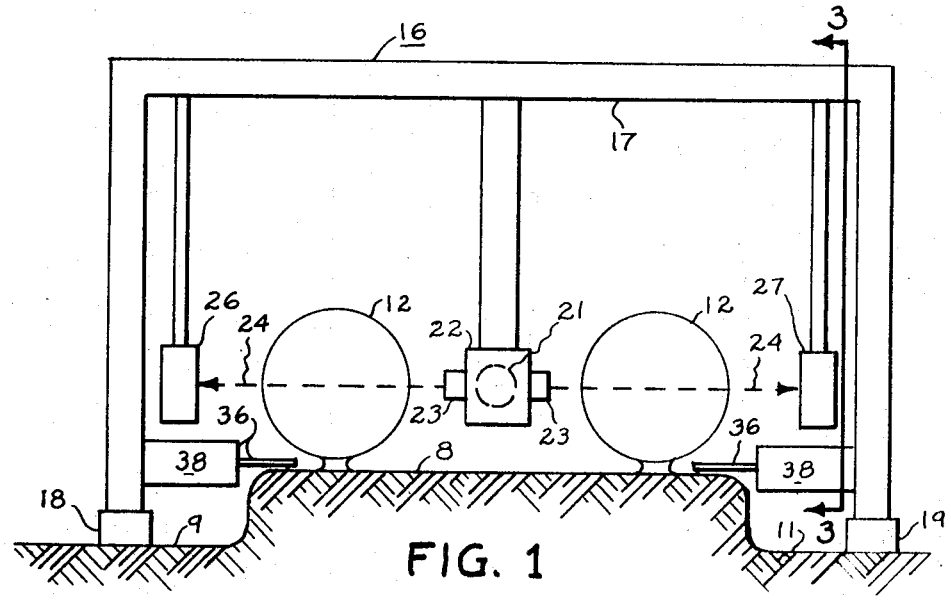
FIG. 1 is a view from the rear looking along a lettuce bed at a produce selector constructed in accordance with the invention, the view being largely diagrammatic.
Figure 2:
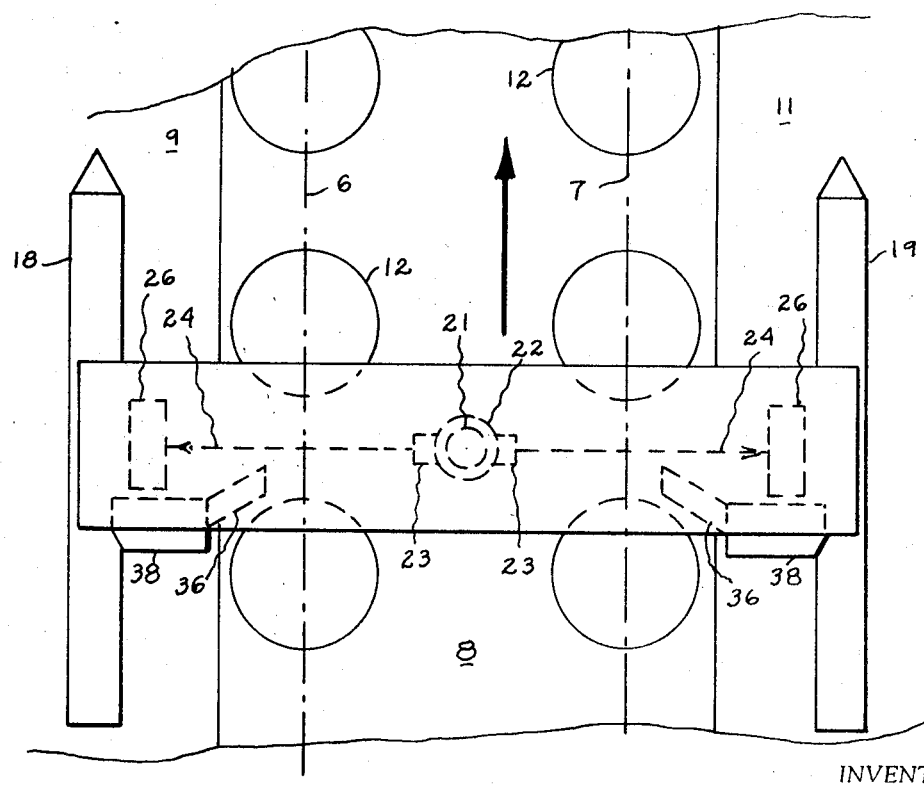
FIG. 2 is a plan of the structure of FIG. 1.
Figure 3:
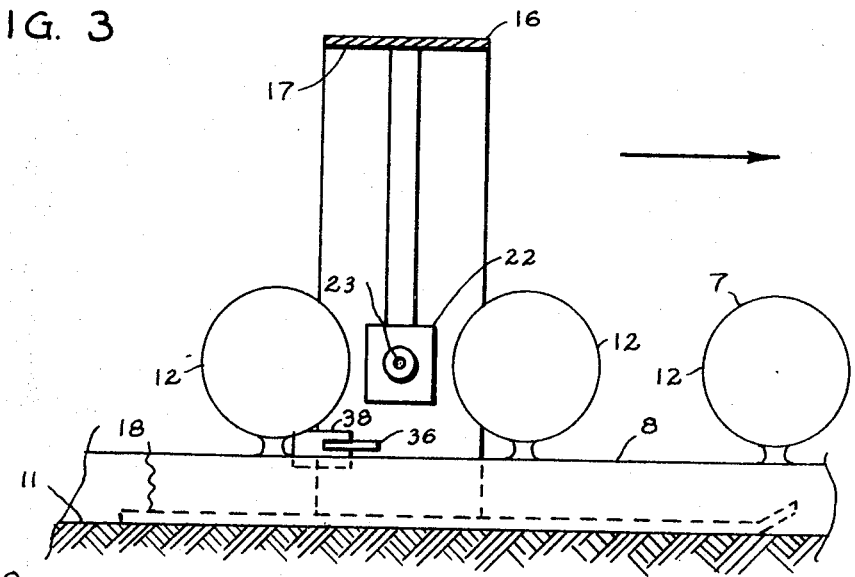
FIG. 3 is a cross section, the plane of which is indicated by the line 3—3 of FIG. 1.

As customarily grown, lettuce is planted in a straight bed in longitudinal rows 6 and 7 spaced a preferred distance apart and established on an earth plateau 8 between irrigation ditches 9 and 11. The lettuce plants 12 as they develop rise from and extend around a bottom stem, doing so at different rates. The individual plants grow relatively close together in a longitudinal direction; i.e. along the row, although they are spaced apart in a lateral or transverse direction even when fully developed. Each of the heads, to a rough approximation, is globular or spherical. The heads differ to a greater or lesser extent from true, geometrical sphericity but they are generally referred to as of that shape. The term "head" may have two meanings. In some instances, the word is intended to mean only the central, rather solid, compact ball like body made up of lettuce leaves folded over each other and extending from the bottom stem in a generally concavely curved fashion. This is the "head" as often found in the retail market. Each lettuce plant as it grows also has a number of frame and wrapper leaves around the outside which do not generally foldover, but are splayed or diverge from the bottom and sides of the lettuce head. This entire plant is often referred to in the field as a "head."

To operate under the usual growing conditions, there is preferably provided a carriage 16 including a suitable framework 17 having runners 18 and 19 designed to slide along the irrigating ditches 9 and 11 so that the carriage, drawn by a tractor or the like, is advanced along the rows 6 and 7 substantially at a constant height above the plateau 8. Although either one of the rows 6 and 7 can be worked individually, it is preferably to work the two rows together and is somewhat more economical.

Pursuant to the invention, a source 21 of radiation depends from the central portion of the carriage 16. The source is enclosed in a shield 22 with all appropriate precautions being preserved to prevent danger or difficulty because of the radiating source. Various forms or types of radiation can be utilized. Presently, it is preferred to utilize a source effective to provide gamma rays of selected flux or penetration or energy. For this purpose, although several radioactive elements (cobalt-60, cesium-137, barium-133) have been utilized, americium-241 is at present believed to be most satisfactory for lettuce. Consequently, within the shield 22 there is provided a body of americium-241 as the source 21. This body is disposed substantially at the median height of the lettuce heads or is disposed as nearly as may be at the same level as the center of the various lettuce heads.

On either side of the source 21 there is provided a collimating aperture 23 so that the radiation, which would other wise fan out from the source 21, is restricted. The gamma rays can emerge through each collimator 23, generally a relatively long tube of small diameter, only in the form of a pencil 24 or beam having a relatively small amount of angular divergence. One pencil 24 of gamma rays travels generally horizontally and transversely to a receiver or receptor 26 on one side of the carriage 16. The similar pencil 24 on the other side of the source travels to a duplicate receptor 27. Between the source and each receptor there is a path for the row of lettuce heads. The receptors are identical and the description of one applies equally to the other. Each of the receptors 26 and 27 has at its entrance a sodium iodide crystal 28, or the like, responsive to the receipt of the gamma rays from the americium source and, when so energized, effective to give off a corresponding burst of photons which are converted to an electric current or "count."

When there is not lettuce head in the path of the gamma ray pencil 24, the receiver 26 or detector is supplied with a maximum amount of gamma rays since there is virtually no radiation attenuation in the atmosphere between the source 21 and the receiver 26 and since the receiver is large enough to intercept substantially all of the gamma rays in the narrow, collimated beam 24.

When a lettuce head is traversed by the pencil beam 24 as the carriage 16 moves along the lettuce row, then the gamma rays are attenuated or partially blocked so that the radiation received by the receiver 26 is reduced. As the carriage 16 advances, the first contact of the gamma ray pencil with the lettuce head produces only slight attenuation, but as the pencil traverses or advances along the lettuce head the attenuation increases to a maximum approximately coinciding with the maximum dimension of the head in a direction across the row 6. The attenuation then decreases as the gamma ray pencil 24 departs form the side of the lettuce head down the row. Thus the signal on the detector 26 decreases and increases in accordance with the transverse distance across the head as the detector moves along the row. The larger the dimension of the head in the direction along the row or parallel to the row 6, the longer the attenuation pattern or curve will be. An exemplary actual curve is reproduced in FIG. 4.

In addition to the pattern or shape of the gamma ray beam trace in accordance with head shape and dimension along the row, the attenuation of the beam due largely to the water content of the lettuce head, at any position of interception by the head, has a relative value that closely depends upon the thickness and density of the head.

Tests of picked heads to determine their volume, by immersion in water with a notation of displacement, coupled with the head weight have shown that head density is quite accurate indication of the condition of the head for harvesting. Although firmness is a good indicator, it has been determined that the head density, so defined, is a better determinant for harvesting. Since size is also important for marketing, a combination of head density and head diameter affords a superior criterion for the harvesting value of an individual lettuce head.

The gamma rays in passing transversely through the head are attenuated in accordance with the head thickness and density. Thus the value of the signal on the detector 26 is largely an indication of thickness and density of the head. Traverse of the source 21 and the detector 26 along the row and from the leading side of the head to the trailing side thereof determines the transverse dimensions. A fair measurement across the curve of FIG. 4 affords an index of the diameter of the head in the row direction.

Figure 6:
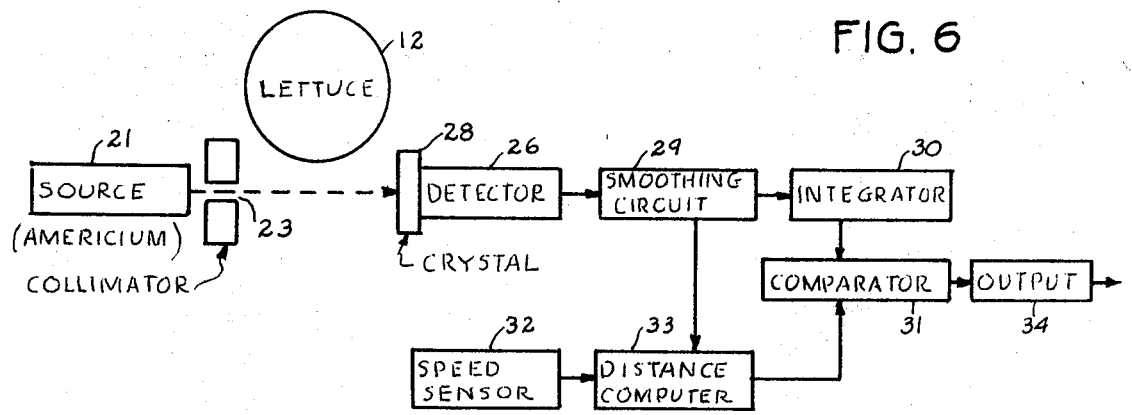
FIG. 6 is a circuit diagram showing one form of circuit for use in connection with the produce selector.

With the foregoing factors available, it is arranged that the detector 26 transmit the received signal due to the attenuated gamma ray beam into a smoothing circuit 29 (FIG. 6) of any convenient kind, this smoothing circuit then transmitting the smoothed signal into an integrator 30 to afford an indication of the mass of the lettuce head. The signal from the integrator is fed into a comparator circuit 31.

Simultaneously, the rate of travel of the carriage 16 along the tow is determined by any convenient means such as a speed sensor 32 (a speedometer) and a signal from the speed sensor is transmitted into a distance computer 33. An input from the smoothing circuit 29 into the distance computer in the nature of a timed impulse is used so that the output of the distance computer affords a linear measure along the row. The output from the distance computer is fed into the comparator 31. Thus the comparator has two signals introduced into it, one the distance along the row as an indication of the head diameter in that direction, and the other the value of the integration of the reduction of the signal passing through the lettuce head representing mass.

If the mass and diameter are appropriate; that is, if the density and size they represent exceed a predetermined threshold value, which may be set or chosen empirically, then the comparator 31 signals an output device 34. Usually the device 34 includes an amplifier and servomechanism effective to actuate a (diagrammatically illustrated) mechanical severing knife 36 quickly operated to sever the stem of the lettuce head 12 which has just been tested. If the density does not exceed the threshold value; that is, if the signal through the lettuce head by the gamma ray pencil is not sufficiently attenuate, indicating that the density is not great, or if the lettuce head diameter along the row is not of high enough value, then the output mechanism 34 is not energized and the severing knife 36 is not projected. The tested lettuce head 12 is not removed, but rather is left in the row to grow further and hopefully to develop into a head dense and large enough to be severed on a subsequent pass of the carriage 16.

As indicated, the detector or receptor 27 is connected in a circuit as described and operates its own output mechanism 37 identical with the output device 34 and effective to actuate selectively its own severing mechanism 38. With this arrangement, either one row of lettuce can be scanned at a time, the receptor 27 being inactivated, or from a single radiation source two rows of lettuce can be scanned at the same time with individual heads in the rows 6 and 7 being selectively harvested, whenever their density and diameter meet the set criteria.

The representative graph of counts per minute (times a factor) received by the detector 26 from an americium source while travelling a distance along the row indicated by the abscissae (FIG. 4) shows that just before the lettuce head is encountered the counts received approximate 200 on the ordinate scale. As the carriage 16 advances, the pencil of gamma rays is more ans more intercepted by the lettuce head and the count of gamma rays received, at approximately 6 centimeters from the origin, drops to a relatively low value, in the vicinity of 130 on the scale. As the lettuce head is scanned the minimum transmission or maximum attenuation of the received beam varies more or less from a plateau. As the lettuce head emerges from the gamma ray beam the received count rises more and more to a value which ultimately approximates the initial number.

Figure 4:
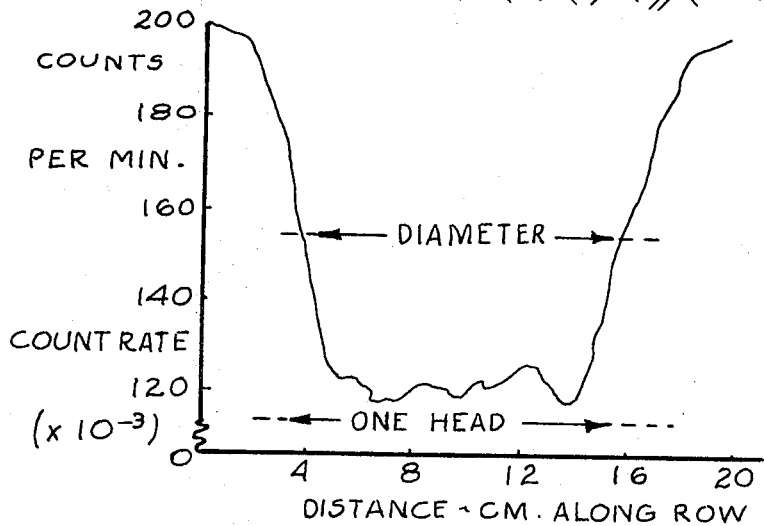
FIG. 4 is a graph showing the results of radiation in connection with head produce selection.
Figure 5:
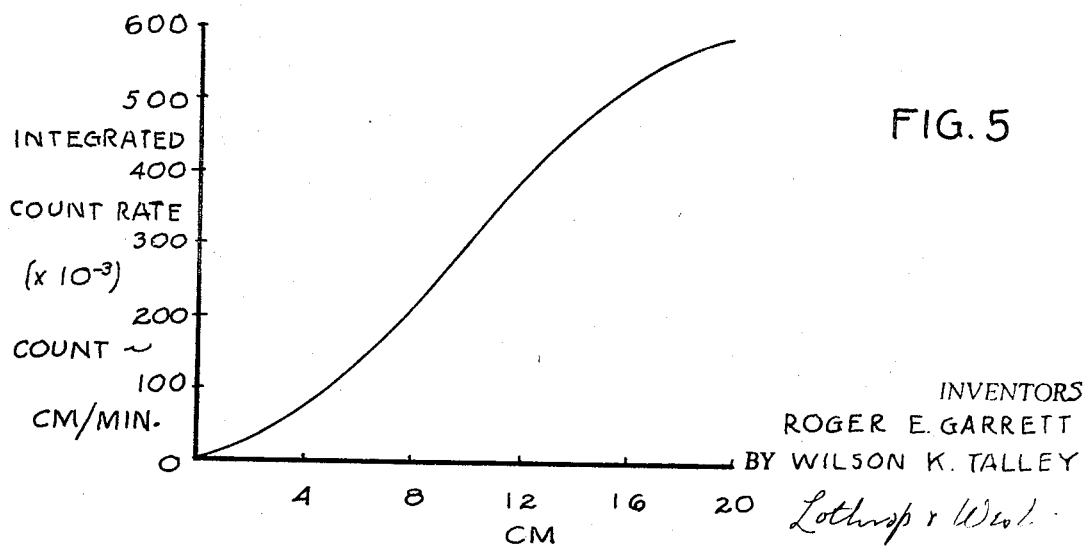
FIG. 5 is a graph showing other results of radiation technique in connection with head produce selection.

The graph in FIG. 4 is in effect a contour of the lettuce head. The distance between the generally vertical portions of the curve gives a close approximation of the diameter of the scanned lettuce head in the direction along the row and in an approximately horizontal plane as nearly as may be to the geometrical center of the lettuce head considered as a sphere. The integrated count rate of FIG. 5 gives a plot of the output of the integrator, a measure of the mass of the head. That output is compared to the measure of the diameter of the lettuce head. If the mass of the head exceeds the amount required for a head of the particular size, the severing knife will be actuated.

Figure 7:
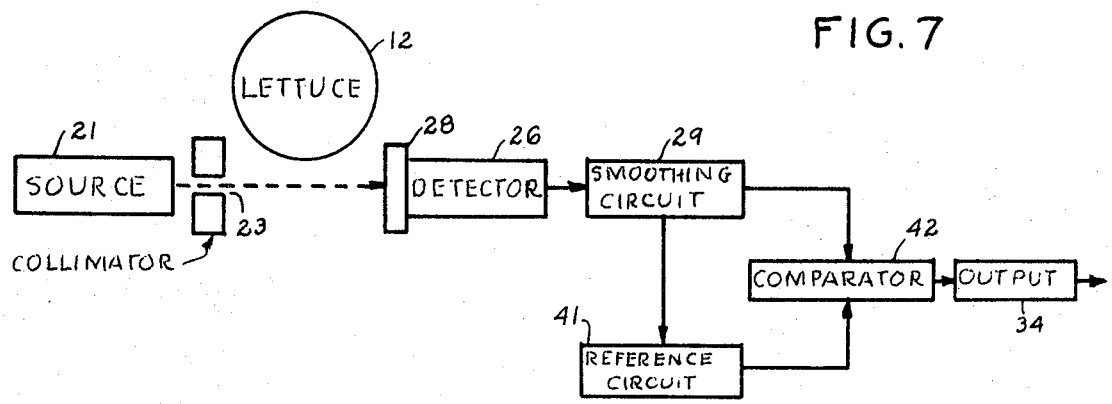
FIG. 7 is a modified form of circuit for use with the produce selector.

For selecting lettuce and perhaps other produce a variation, with a simple circuit, can be provided. This is because, historically, people accept large heads as satisfactory even though they may be less dense. For lettuce, true density ($D^2$) is not necessarily determined. A factor (D) representing thickness or diameter can be used instead for practical satisfaction on the assumption that the density in fact may be low if the head is large enough. If this assumption is acceptable, the integrator, the speed sensor and the distance computer may be eliminated. The diagram in FIG. 7 shows the simplified circuitry. In general this is like that of FIG. 6 in that there is a radiation source 21 with a collimator 23 passing a gamma ray pencil 24 to a detector 26 as before. The output of the detector 26 in FIG. 7 is fed to a smoothing circuit 29. In this instance the smoothing circuit also supplies base data for reference circuit 41 which affords a reasonably steady voltage level as a datum. The reference voltage can be derived from the smoothing circuit by utilizing a long time constant. The smoothing circuit and the reference circuit feed directly into a comparator 42 substantially the same as the comparator 31. The comparator checks or compares the smoothed detector output to the relatively constant datum provided by the reference circuit. If the attenuation is inconsequential, then the comparator 42 does not provide any output signal. If the attenuation, due to the interposition of a lettuce head, is substantial, then a signal from the comparator activates the output mechanism 34 to cause the severing devices 36 or 38 to function. In this instance the attenuation of the gamma ray beam is used as a measure of two factors, one the (maximum) density of the lettuce head, and the other the diameter of the lettuce head measured transversely of the row. Thus the circuits of FIG. 6 or FIG. 7 can be utilized as a matter of choice depending upon the preference for utilizing the lettuce head dimension along the row or the lettuce head dimension across the row.

Figure 8:
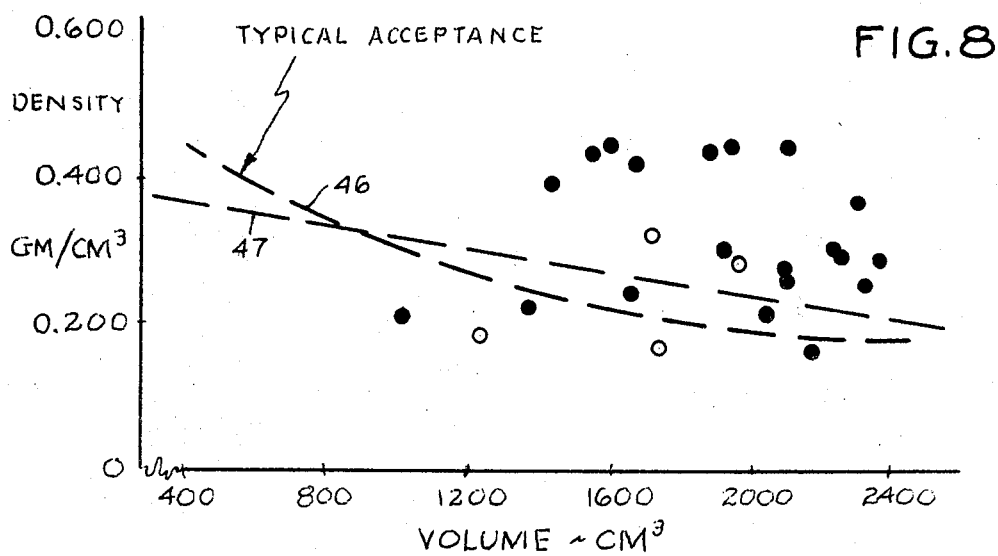
FIG. 8 is a graph showing a harvesting acceptance relationship between the volume of a lettuce head and the density of the lettuce head.

As indicated in FIG. 8, the density of a number of lettuce heads is plotted against the size (volume) of the same lettuce heads. All of the heads judged acceptable or marketable by a number of careful experts achieving consistent results according to present-day standards are indicated by the solid dots in the figure. Those heads which were considered by the same panel or experts according to their best judgment and the present current standards as unacceptable are plotted by open circles. Actual operation of mechanism according to the disclosure herein indicates that automatic selecting operations can closely approximate what may be termed an acceptance curve 46. That is, a fair curve drawn among the various points indicating acceptable and unacceptably heads may be used as an arbitrary but satisfactory dividing line. The mechanism has in general accepted almost all of the heads, above the line, that the expert panel found acceptable and has rejected nearly all the heads, below the line, that the expert panel found unacceptable. It has as been found by experience that the variation due to the machine selection over a period of time is less than the variance between different individual experts on the panel or between individual selections at different times. The present device (either circuit) consistently makes selections which are at least equal to and often are superior to the results arrived at by the best selection panel.

The criteria for acceptance often vary due to economic factors. For example, one field may be of consistently high quality and another field may be of consistently low quality. The human tendency in the high quality field is to reject certain of the lower density or lower diameter heads, whereas in the low quality field sometimes heads of comparatively low density and diameter are nevertheless accepted. This variation, if desired, can be taken care of the present device in effect by moving the typical acceptance curve 46 upwardly or downwardly or to the left or to the right. That sort of adjustment can be made in the comparator 31 or the comparator 42 by either by shifting the standard base or datum or by adjusting the threshold of attenuated count which will provide an actuation. The typical acceptance curve 46 is a true curve but is closely approximated by a straight line 47. The design of the comparators 31 and 42 can be based either on a straight line acceptance demarcation or on an appropriate curved acceptance demarcation.

Tests have shown that the infinitesimal amount of radiation in the collimated beam 24 is in no wise deleterious to or destructive of the material being scanned; i.e. the lettuce head, and produces no residual, harmful effects. This is partly because only a very small portion of the lettuce head in the equator region is actually penetrated by the beam. Earlier attempts to utilize radiation from a source exposed the entire lettuce head to radiation, much of which was widely and randomly scattered so that no effective or consistent readings could be obtained on a receiver. By collimating the radiation beam to a very small pencil only a minor part of the lettuce head is subjected to the radiation and there is substantially no scattering. The received count or the attenuated beam at the receiver is accurate for commercial purposes.

Our method of selecting produce such as lettuce or other growing plants having a similar configuration by means of radiation can be accomplished with other sources of beam or pencil rays and with satisfactory results based on the density of the object and its diameter as criteria for picking maturity.

We claim:
1. A produce selector for selecting generally spherical objects from a row comprising: a frame movable along said row and having portions on opposite sides thereof, means on said frame on one side of said row housing a source of gamma rays and means for collimating gamma rays from said source into a pencil shaped beam of small lateral dimensions relative to the dimensions of said objects; sensing means on said frame on the other side of said row positioned to receive said beam, said collimating means and sensing means being positioned on said frame at a level to project said beam through successive portions of said objects only substantially midway between the tops and bottoms thereof as said frame moves along said row; and means responsive to said sensing means for producing a varying signal dependent upon both the density of an object and the dimension thereof in the direction of frame movement along said row.